UNITED STATES PATENT OFFICE 2,587,999

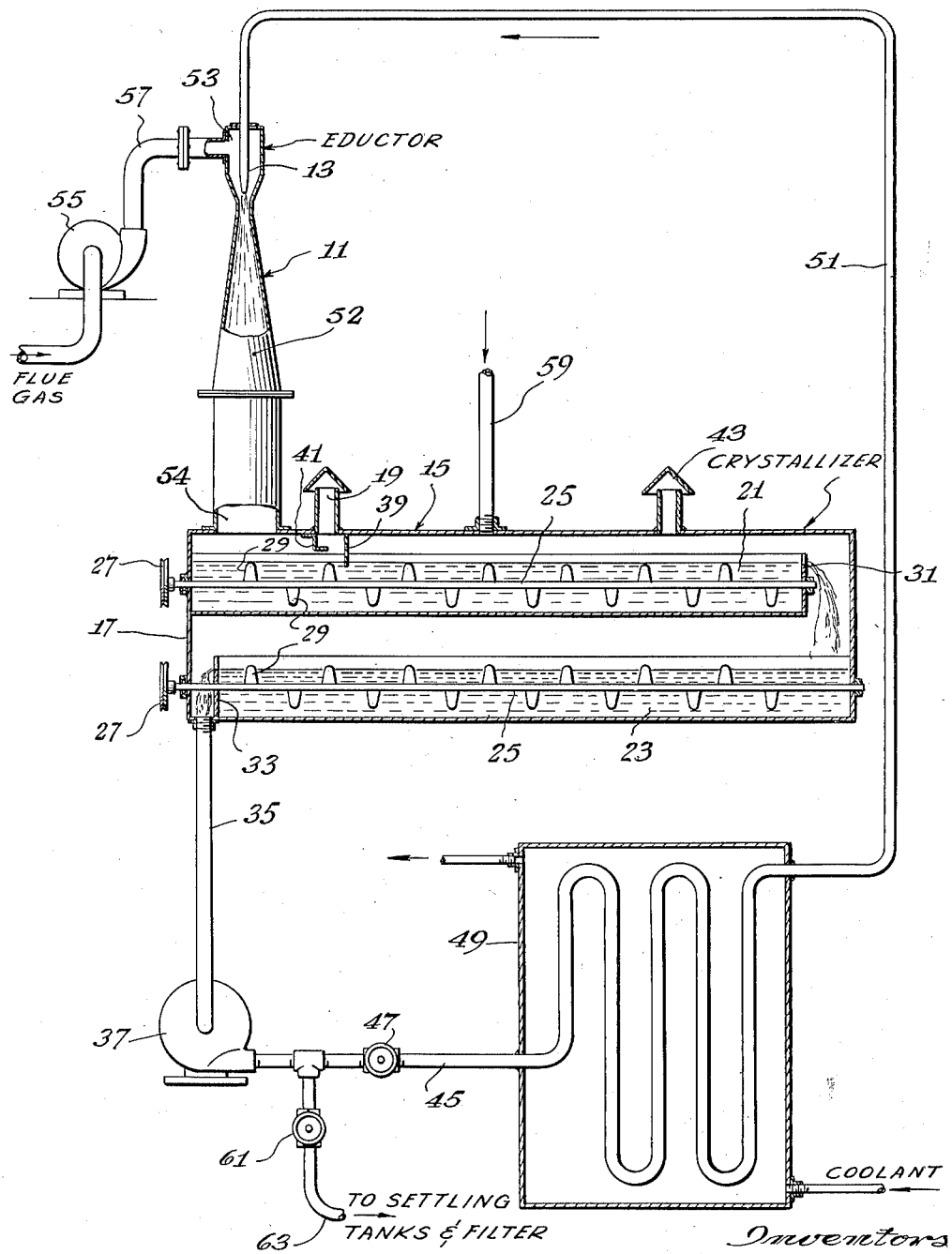

MANUFACTURE OF CHALK

Harold H. Heller, Appleton, and George H. Saunders, Neenah, Wis., assignors to Paper Patents Company, Neenah, Wis., a corporation of Wisconsin Application June 27, 1950, Serial No. 170,628

8 Claims. (Cl. 23—66)

The present invention relates to improvements in the manufacture of chalk and, more particularly, to the manufacture from lime, of chalk suitable for paper coating.

For the purposes of this case, lime is deemed to include quicklime, a product made by calcining limestone, and also hydrated lime or calcium hydroxide, a product made by adding water to quicklime. Also, the term chalk as used herein, means a substance composed principally of calcium carbonate in crystalline form, the crystals having a maximum dimension of not more than about 15 microns.

Heretofore, chalk for paper making and other purposes has, in general, been made by two methods. In one method, carbon dioxide is bubbled into a body of an aqueous slurry of lime which is subjected to violent agitation, until all of the lime is converted into chalk. In the other method, carbonation is effected by producing a fine spray or mist of a lime slurry in a spray tower having an atmosphere containing a substantial amount of carbon dioxide. In the latter method, the sprayed slurry is recycled through the chamber until all of the lime is transformed into chalk. While both of these methods have been in use for many years, they are subject to many objections. First, it is difficult, if not impossible under most conditions, to obtain chalk crystals of the desired particle size, i. e. less than 15 microns and preferably less than 3 microns in maximum dimension. Second, if small crystals are obtained by careful control of the process, these crystals become agglomerated or cemented together to produce large masses of crystals which have an effective particle size many times greater than that desired. Third, the prior art chalks are not of uniform crystalline size, the size of the particles ranging downwardly from very large, unusable particles to the particles of desired size. Because of the physical characteristics of chalk and the low cost at which it must be sold, it has been found impractical to grind the oversized particles to a uniform particle size of less than 15 microns.

The principal object of this invention is to provide an efficient and economical process for manufacturing chalk in which the particles are of extremely small size, i. e. less than 15 microns and for some uses less than 3 microns. A more specific object of the invention is the provision of a process for manufacturing chalk of uniform particle size and which consists substantially entirely of individual crystals as contrasted to agglomerated masses of the crystals. A further object of the invention is to provide a process which is capable of adjustment so as to produce chalk within very close limits of the desired average particle size.

The success of our improved process is predicated upon a number of important discoveries. In the first place, we have discovered that, in carbonating a solution or slurry of calcium hydroxide whether containing additional suspended calcium hydroxide or not, any over carbonation of the batch or of any portion of the batch will produce calcium bicarbonate, which is more soluble than the calcium carbonate. When the bicarbonate is present in a lime slurry in even extremely minute amounts, calcium carbonate will appear in the form of a relatively small number of large crystals instead of in a large number of small crystals of the desired size. We have made the further discovery that when a slurry or solution of calcium hydroxide is carbonated to prevent the formation of objectionable calcium bicarbonate, there is formed in the liquid a floc precipitate of amorphous calcium carbonate. If this floc is formed in the proper manner and held under the right conditions for a sufficient period of time after formation, it will become converted into chalk crystals of relatively small dimensions, for example less than .25 micron. The crystallization of the floc into small chalk crystals can be accomplished by segregating or isolating the floc precipitate from the zone in which the carbonation is effected for a sufficient length of time (a period of the order of a few minutes). As a result of this isolation, the floc will have time to crystallize before there is any possibility of it reentering the point or zone where the carbonating of the batch is being effected.

We have also discovered that it is extremely important in producing a calcium carbonate floc which will crystallize into chalk having many fine, unagglomerated crystals, that the solution or slurry be carbonated substantially instantaneously, i. e. in a period of not more than a small fraction of a second. In addition, the carbonated slurry should be immediately removed from the carbonating zone. Moreover, it is desirable when carbonating to form sufficient floc to produce a concentration of calcium carbonate floc of about 0.85 gram per liter. This means that at least about 0.6 gram of calcium hydroxide is carbonated.

Some of the principles of the invention may be utilized in carbonating clear calcium hydroxide solutions, however, in commercial operation it is best to carbonate an aqueous slurry containing from 5 to 15 per cent of calcium hydroxide at a temperature of from 15 to 35° C. there then being about 1.6 grams per liter of the hydroxide in solution.

In practicing the invention, we carbonate a continuously flowing stream of a slurry of calcium hydroxide substantially instantaneously and rapidly remove the slurry from contact with the $CO_2$ in the carbonating zone before there is any danger of local overcarbonation. The majority of the carbonating should desirably be effected in a small fraction of a second, i. e. in less than 0.1 second and the carbonated slurry should not remain in the carbonating zone for over about 0.5 second. After carbonation, the slurry is conducted to a holding zone in which the slurry is agitated a sufficient amount to maintain the calcium hydroxide particles, the chalk crystals, and the amorphous floc in suspension. The holding zone may comprise a holding tank which is large enough to retain the slurry for a sufficient length of time to permit the floc to crystallize. A sufficient holding time under the temperatures set forth above will be between 1 and 5 minutes. The slurry in the holding zone is preferably so handled and guided that there is substantially no channelling through the holding zone, that is to say, that the body of slurry in the holding zone progresses uniformly therethrough during operation without having one portion move forward at an appreciably faster rate of speed than any other portion. If there is an appreciable amount of channelling, the crystals grow at uneven rates and there is usually a sufficient amount of carbonation of slurry carrying floc to cause the formation of extremely large crystals and/or agglomerations of crystals.

The slurry from the holding zone is recycled through the carbonation zone where the stream of the slurry is substantially instantaneously mixed with the carbon dioxide and again immediately conducted away from the carbonation zone.

In selecting the raw materials for the process, we prefer a type of lime which has been obtained by calcining a good grade of lime stone and which contains a relatively small percentage of magnesium or other impurities. The hydration of the lime, for obvious reasons, is preferably effected at the point where the chalk is to be manufactured. After hydration, the hydrated lime is treated in a rod or ball mill in order to reduce the size of any large particles. The purpose of this is to insure that the particles of calcium hydroxide in the slurry are all so small that the refortification of the solution phase of calcium hydroxide will be practically instantaneous. Preferably, there should be in the slurry, no particles of calcium hydroxide larger than 25 microns in the maximum dimension.

In transforming a batch of calcium hydroxide slurry containing for example 6 per cent of calcium hydroxide to a slurry of chalk crystals, it should be noted that calcium hydroxide is relatively insoluble (1.6 grams/liter). Thus, it will be understood that, before the carbonation of the entire batch can be completed, it will be necessary to pass or recycle the batch through the carbonating zone a number of times. For example, when the rate of carbonation is such that 0.6 gram per liter of calcium hydroxide is carbonated per pass, the batch will be recycled about 50 times. At the end of 50 passes or recyclings, all of the suspended calcium hydroxide will be found to have been converted to chalk crystals which will then be suspended in the liquid.

As a practical matter, it is not feasible to effect any mechanical separation of the suspended chalk crystals from suspended particles of calcium hydroxide or other material. Therefore, it is desirable to convert substantially all of the calcium hydroxide to chalk and then, when the whole batch is substantially completely converted, the chalk can be readily removed or separated from the liquid in any suitable manner. For example, the slurry may be first diluted with clear water and then settled or thickened in a settling tank, the thickened sludge may be further dewatered or concentrated in a conventional filter, for example in a conventional Oliver filter, and the concentrated slurry may then be dried. If the chalk is to be used for coating paper, the concentrated slurry may be used in making up the coating without further treatment. This direct use of the slurry in paper making eliminates much of the expense of drying the chalk particles and re-suspending them.

Under certain conditions, it may be desirable to maintain the suspended calcium hydroxide concentration in the slurry at a minimum and this may be accomplished by gradually adding calcium hydroxide to the solution being recycled, the amount added being in direct proportion to the amount being carbonated. This method of operation, however, is attended with control and other operating difficulties, and is not so convenient or economical as operating on a batch of calcium hydroxide slurry.

In the drawing accompanying this application there is illustrated, in somewhat diagrammatic form, a set of equipment which is especially adapted for carrying out the method which has been described. The illustrated apparatus includes an eductor 11 in which carbon dioxide is substantially instantaneously intermixed with a stream of slurry emerging from a nozzle 13 which constitutes a portion of the eductor. The outlet of the eductor 11 is connected to a crystallizer 15 which in the illustrated drawings comprises a chamber 17 having a vent 19 for the discharge of the spent gas and also having a plurality, in this instance a pair, of superposed flow boxes 21 and 23.

The boxes 21 and 23 are of sufficient length to hold the carbonated slurry for at least 5 minutes after it enters the crystallizer. The flow boxes 21 and 23 are preferably in the form of semi-circular troughs or launders of considerable length relative to diameter. Each of the boxes 21 and 23 is equipped with a horizontally disposed, longitudinally extending shaft 25 which carries several small blades or fins 29 which serve to mix or stir the slurry during the time that it is in the crystallizer and during the period in which the change from the amorphous floc to the crystalline state is taking place. The shafts 25 extend outwardly of the chamber 17 and the outer end of each shaft is provided with a pulley 27 which is connected to a source of power not shown. The degree of agitation effected by the rotation of shafts 25 is just sufficient to maintain the particles of calcium hydroxide and the crystals of chalk in suspension. As illustrated, the carbonated slurry enters the crystallizer directly from the outlet of the eductor 11, whereupon it flows by gravity from the left-hand end of the upper trough 21, over an end wall 31 in the trough, down into the right-hand end of the lower trough 23 through which it flows by gravity and out of the end of the trough 23 over an end wall 33 to a discharge pipe 35 which leads to a pump 37.

It should be noted that the vent 19 is located closely adjacent the outlet of the eductor 11 and that a baffle wall 39 is disposed from the upper wall of the chamber 17 to a point below the level of the slurry to insure that any carbon dioxide from the eductor 11 is prevented from coming in contact with the slurry in the crystallizer 15. In order that the slurry does not flow out through the vent, a baffle 41 is provided adjacent the lower end of the vent 19. Another vent 43 is disposed outwardly of the baffle wall 39 to vent any carbon dioxide which might travel along the trough 21 from the system.

While a specific form of crystallizer has been described, it will be understood that the crystallizer may be made in any other manner which will provide an elongated flow path, as for example, a U-shaped tank, a large rectangular tank having a mid-feather, etc. As it has been pointed out, it is extremely important that all of the carbon dioxide be removed from contact with the carbonated slurry as soon as possible after the amorphous floc has been formed. Under some circumstances, it may be desirable to blow fresh air across the upper surfaces of the flow boxes 21 and 23 to carry away any carbon dioxide gas which might be present.

The pump 37 is connected by means of a pipe 45 through a valve 47 to a heat exchanger 49. In the heat exchanger the slurry is passed through pipelines which are immersed in cold circulating water or other suitable refrigerant. The temperature of the slurry is so regulated that when it reaches the crystallizer it is between 15 and 60° C. The cool slurry is then passed through the pipeline 51 to the nozzle 13 of the eductor 11 where carbonation is again effected.

The mixing and carbonating is carried out in the eductor 11 (which is also known as a jet ejector or vapor condenser). This is a commercially available piece of apparatus wherein a high velocity jet of liquid from the nozzle 13 is directed axially along a Venturi-shaped passageway 52 which extends between an inlet chamber 53 and the discharge end 54 of the unit. The lower end of the Venturi-shaped passageway presents an outwardly tapering conical surface to the high velocity stream of slurry emerging from the nozzle 13, and the conical surface is proportioned to parallel the outer limits of the jet emerging from the nozzle 13. The inlet chamber 53 is connected to a blower 55 by means of a pipeline 57, the inlet of the blower being connected to a source of $CO_2$ such as flue gas or lime kiln gas. It will be understood that the gas before it enters the blower is preferably cleaned and scrubbed in any type of conventional equipment.

The stream of slurry is transformed into a conical jet which scrubs the sides of the tapered wall portion of the eductor 11 and causes eddy-diffusion absorption of the $CO_2$ in the unit. The amount of absorption taking place in the eductor 11 is dependent upon the velocity of the stream of slurry and the concentration of $CO_2$ in the gas being used.

*Specific example*

A batch of 5,500 gallons of 5.5 per cent by weight of calcium hydroxide slurry was made by mixing hydrated lime with clear water. The size of the particles of calcium hydroxide in the slurry were reduced until substantially all were below 15 microns. The slurry was then introduced into the crystallizer 15 through an inlet pipeline 59. The crystallizer 15 was so proportioned that it would hold all of the batch except an amount sufficient to fill the pipelines 35, 45, and 51 of the system. The pump 37 was started in operation to circulate the slurry at a rate of 1,100 gallons per minute, this giving a holding time of about 5 minutes in the crystallizer 15. The blower 55 was connected to a source of flue gas containing 12 per cent carbon dioxide and the blower was adjusted to deliver about 40,000 cubic feet (total volume, basis of atmospheric temperature and pressure) to the chamber 53 of the eductor 11. The eductor was provided with a nozzle 13 having a diameter of 3 inches so that the velocity of the Venturi throat of the eductor was approximately 50 feet per second. The temperature of the slurry passing through the heat exchanger was adjusted until the temperature of the slurry in the crystallizer 15 was 25° C.

The slurry was recycled in the unit for 4 hours at which time it was calculated that each portion of the slurry had passed through the carbonating zone 48 times.

A series of analyses of the slurry showed that 1.5 grams of calcium carbonate were formed in each liter of slurry on each pass through the nozzle 13, this giving a high floc concentration in a relatively short period of time. The time of carbonation was very rapid. A series of gas composition tests showed that about 80 per cent of the carbonation was effected in a space of about 6 inches below the nozzle 13 and this means that 80 per cent of the carbonation occurred in 0.01 second. The remaining 20 per cent of the carbonation was found to have occurred in the outlet pipe of the eductor 11 (in a distance of about 8 feet) in a time of about .16 second, and in the initial few feet of the crystallizer 15 ahead of the baffle wall 39. In all, the total time in which the slurry was exposed to free carbon dioxide was less than 0.2 second.

After the carbonation was completed, the valve 47 was closed, valve 61 in the pipeline 63 was opened, the slurry then being discharged to a settling tank and filter arrangement wherein the slight excess of calcium hydroxide was washed from the calcium carbonate crystals and the crystals were concentrated into a slurry containing 40 per cent chalk crystals by weight. A portion of the slurry resulting from the process was examined under an electron microscope and it was determined that the particle size ranged between 0.75 and 2.0 microns and that there was no evidence of agglomeration or cementing together of these particles. The slurry made as above was employed in coating paper in the usual manner and it was found that the paper had a high brightness and an excellent finish.

The process which has been described in the foregoing was capable of producing chalk particles of uniform size distribution and having an extremely small particle size. This control of the particle size is made possible by the substantially instantaneous carbonation, the immediate removal of the carbonated slurry from the carbonation zone, by the minimizing of carbonation after the slurry has left the carbonation zone, and by the use of sufficient agitation to maintain the solid material in the slurry in a suspended state. These conditions are not maintained in the usual spray tower carbonating equipment nor in the dasher type of equipment wherein a body of slurry is subjected to a violent agitation while it is being carbonated.

This application is a continuation-in-part of our prior application Serial No. 684,685, filed on July 19, 1946, (now abandoned) and assigned to the assignee of this invention.

Various of the features of the invention which are believed to be new are set forth in the appended claims.

We claim:

1. Method of making chalk crystals which are substantially unagglomerated comprising:

(a) making an aqueous slurry of calcium hydroxide in which the amount of calcium hydroxide in suspension is many times the amount in solution;

(b) intermixing carbon dioxide with a stream of said slurry for a fraction of a second, said intermixing resulting in the formation of an amorphous calcium carbonate floc;

(c) promptly conducting the carbonated slurry away from the point of carbonation to a holding zone which is substantially free of carbon dioxide;

(d) holding said carbonated slurry in said holding zone for at least from 1 to 5 minutes while agitating said slurry to maintain the solid materials in suspension, during which period said floc crystallizes;

(e) then repeating steps (b), (c), and (d) a sufficient number of times to convert substantially all of the suspended calcium hydroxide into chalk.

2. Method of making chalk crystals which are substantially unagglomerated comprising:

(a) making an aqueous slurry of calcium hydroxide in which the amount of calcium hydroxide in suspension is many times the amount in solution;

(b) intermixing carbon dioxide with a stream of said slurry for a fraction of a second, said intermixing resulting in the formation of an amorphous calcium carbonate floc;

(c) promptly conducting the carbonated slurry away from the point of carbonation to a holding zone which is substantially free of carbon dioxide;

(d) holding said carbonated slurry in said holding zone for at least from 1 to 5 minutes while agitating said slurry to maintain the solid materials in suspension, during which period said floc crystallizes, the temperature of the slurry in the holding zone being maintained between 15 and 60° C.

(e) then repeating steps (b), (c), and (d) a sufficient number of times to convert substantially all of the suspended calcium hydroxide into chalk.

3. Method of making substantially unagglomerated chalk crystals having a maximum dimension of less than 3 microns which comprises:

(a) making an aqueous slurry of calcium hydroxide in which the amount of calcium hydroxide in suspension is many times the amount in solution;

(b) intermixing carbon dioxide with a stream of said slurry for a fraction of a second to carbonate at least 0.6 gram per liter of calcium hydroxide thereby resulting in the formation of an amorphous calcium carbonate floc;

(c) promptly conducting the carbonated slurry away from the point of carbonation to a holding zone which is substantially free of carbon dioxide;

(d) holding said carbonated slurry in said holding zone for at least from 1 to 5 minutes while agitating said slurry to maintain the solid materials in suspension, during which period said floc crystallizes;

(e) then repeating steps (b), (c), and (d) a sufficient number of times to convert substantially all of the suspended calcium hydroxide into chalk.

4. Method of making substantially unagglomerated chalk crystals having a maximum dimension of less than 3 microns which comprises:

(a) making an aqueous slurry of calcium hydroxide in which the amount of calcium hydroxide in suspension is many times the amount in solution;

(b) intermixing carbon dioxide with a stream of said slurry for a fraction of a second, said intermixing resulting in the formation of an amorphous calcium carbonate floc;

(c) promptly conducting the carbonated slurry away from the point of carbonation to a holding zone which is substantially free of carbon dioxide gas, the entire period during which said slurry is in contact with a carbon dioxide bearing atmosphere being less than 0.5 second;

(d) holding said carbonated slurry in said holding zone for at least from 1 to 5 minutes while agitating said slurry to maintain the solid materials in suspension, during which period said floc crystallizes;

(e) then repeating steps (b), (c), and (d) a sufficient number of times to convert substantially all of the suspended calcium hydroxide into chalk.

5. Method of making substantially unagglomerated crystals of chalk having a maximum dimension of less than 3 microns which comprises:

(a) making an aqueous slurry of calcium hydroxide in which the amount of calcium hydroxide in suspension is many times the amount in solution;

(b) intermixing carbon dioxide with a stream of said slurry for a fraction of a second to produce amorphous calcium carbonate floc in a concentration of at least 0.85 gram per liter;

(c) promptly conducting the carbonated slurry away from the point of carbonation to a holding zone which is substantially free of carbon dioxide gas;

(d) holding said carbonated slurry in said holding zone for at least from 1 to 5 minutes while agitating said slurry to maintain the solid materials in suspension; during which period said floc crystallizes, the temperature of the slurry in the holding zone being maintained between 15 and 60° C.;

(e) then repeating steps (b), (c), and (d) a sufficient number of times to convert substantially all of the suspended calcium hydroxide into chalk.

6. Method of making substantially unagglomerated crystals of chalk having a maximum dimension of less than 3 microns which comprises:

(a) making an aqueous slurry of calcium hydroxide in which the amount of calcium hydroxide in suspension is many times the amount in solution;

(b) intermixing carbon dioxide with a stream of said slurry for a fraction of a second, said intermixing resulting in the formation of at least 0.85 gram per liter of an amorphous calcium carbonate floc;

(c) promptly conducting the carbonated slurry away from the point of carbonation to a holding zone which is substantially free of carbon dioxide gas, the entire period during which said slurry is in contact with a carbon dioxide bearing atmosphere being less than 0.5 second;

(d) holding said carbonated slurry in said holding zone for at least from 1 to 5 minutes while agitating said slurry to maintain the solid materials in suspension, during which period said floc crystallizes, the temperature of the slurry in the holding zone being maintained between 15 and 60° C.;

(e) then repeating steps (b), (c), and (d) a sufficient number of times to convert substantially all of the suspended calcium hydroxide into chalk.

7. Method of making substantially unagglomerated crystals of chalk which comprises:

(a) making an aqueous slurry of calcium hydroxide in which the amount of calcium hydroxide in suspension is many times the amount in solution and in which the size of the calcium hydroxide particles is less than 25 microns;

(b) intermixing carbon dioxide with a stream of said slurry for a fraction of a second to produce an amorphous calcium carbonate floc;

(c) promptly conducting the carbonated slurry away from the point of carbonation to a holding zone substantially free of carbon dioxide;

(d) holding said carbonated slurry in said holding zone for at least from 1 to 5 minutes while agitating said slurry to maintain the solid materials in suspension, during which period said floc crystallizes;

(e) then repeating steps (b), (c), and (d) a sufficient number of times to convert substantially all of the suspended calcium hydroxide into chalk.

8. Method of making substantially unagglomerated crystals of chalk having a maximum dimension of less than 3 microns which comprises:

(a) making an aqueous slurry of calcium hydroxide in which the amount of calcium hydroxide in suspension is many times the amount in solution and in which the size of the calcium hydroxide particles is less than 25 microns;

(b) intermixing carbon dioxide with a stream of said slurry for a fraction of a second, said intermixing resulting in the formation of at least 0.85 gram per liter of an amorphous calcium carbonate floc;

(c) promptly conducting the carbonated slurry away from the point of carbonation to a holding zone which is substantially free of carbon dioxide gas, the entire period during which said slurry is in contact with a carbon dioxide bearing atmosphere being less than 0.5 second;

(d) holding said carbonated slurry in said holding zone for at least from 1 to 5 minutes while agitating said slurry to maintain the solid materials in suspension, during which period said floc crystallizes, the temperature of the slurry in the holding zone being maintained between 15 and 60° C.;

(e) then repeating steps (b), (c), and (d) a sufficient number of times to convert substantially all of the suspended calcium hydroxide into chalk.

HAROLD H. HELLER.
GEORGE H. SAUNDERS.

REFERENCES CITED

The following references are of record in the file of this patent:

UNITED STATES PATENTS

| Number | Name | Date |
| --- | --- | --- |
| 1,178,962 | Statham | Apr. 11, 1916 |
| 1,266,339 | Statham | May 14, 1918 |
| 2,058,503 | Rafton et al. | Oct. 27, 1936 |

OTHER REFERENCES

Mellor, "Inorganic and Theoretical Chemistry," page 817, vol. 3, 1923, Longmans, Green & Co., N. Y.